US012530908B2

United States Patent
Takahashi (10) Patent No.: US 12,530,908 B2
(45) Date of Patent: Jan. 20, 2026

(54) WRONG-WAY DRIVING DETERMINATION METHOD AND WRONG-WAY DRIVING DETERMINATION DEVICE

(71) Applicant: TOYOTA JIDOSHA KABUSHIKI KAISHA, Toyota (JP)

(72) Inventor: Takenoshin Takahashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 519 days.

(21) Appl. No.: 17/981,546

(22) Filed: Nov. 7, 2022

(65) Prior Publication Data

US 2023/0230390 A1    Jul. 20, 2023

(30) Foreign Application Priority Data

Jan. 17, 2022   (JP) ................................ 2022-005277

(51) Int. Cl.
*G06V 20/58* (2022.01)
*G06V 20/56* (2022.01)

(52) U.S. Cl.
CPC .......... *G06V 20/582* (2022.01); *G06V 20/588* (2022.01); *G06V 2201/07* (2022.01)

(58) Field of Classification Search
CPC .............. G06V 20/582; G06V 20/588; G06V 2201/07; G06V 20/58; G06V 20/56; G06V 20/625; G06V 20/584; G06V 10/82; G06V 2201/08; G06V 10/764; G06V 20/54; G06V 10/16; G06V 10/811; G06V 20/52; G06V 10/25; G06V 10/96; G06V 20/40; G06V 30/10; G06V 40/172; G06V 20/63; G06V 10/255; G06V 10/32; G06V 10/761; G06V 20/64; G08G 1/056; G08G 1/0125; G08G 1/16; G08G 1/167; G08G 1/09626; G08G 1/0104; G08G 1/168; G08G 1/0108; G08G 1/0116; G08G 1/096725; G08G 1/205; G08G 1/005; G08G 1/095; G08G 1/0969;
(Continued)

(56) References Cited

U.S. PATENT DOCUMENTS 10,885,358 B2 * 1/2021 Lindemann ............ G08G 1/205
2008/0013789 A1 * 1/2008 Shima .................. G06V 20/588
                                                                   382/104
(Continued)

FOREIGN PATENT DOCUMENTS

JP     2007-293390 A     11/2007
JP     2008-181328 A     8/2008
(Continued)

*Primary Examiner* — Nimesh Patel
(74) *Attorney, Agent, or Firm* — Oliff PLC (57) ABSTRACT

The wrong-way driving determination method includes acquiring a backward image of the vehicle, recognizing a target included in the backward image, and determining the wrong-way driving of the vehicle based on the recognition information of the target. Here, determining the wrong-way driving includes determining whether or not the recognition information of the target includes the recognition information of the guide display surface of the traffic sign. When it is determined that the recognition information of the guide display surface is included in the recognition information of the target, it is determined that the vehicle is traveling in the wrong direction.

1 Claim, 4 Drawing Sheets

(58) Field of Classification Search
CPC ........ G08G 1/146; G08G 1/166; G08G 1/165; B60R 2001/1253; B60R 2300/8066; B60R 2300/105; B60R 1/26; B60R 1/00; B60R 2300/802; B60R 2300/8093; B60R 2001/1215; B60R 2300/806; B60R 1/04; B60R 1/08; B60R 2300/8026; B60R 2300/301; B60R 2300/804; B60R 1/22; B60R 1/081; B60R 2011/0033; B60R 1/29; B60R 2011/004; B60R 25/305; B60R 1/25; B60R 2300/106; B60R 2300/202; B60R 2300/207; B60R 2300/305; B60R 1/02; B60W 50/14; B60W 2050/143; B60W 2420/403; B60W 30/12; B60W 2050/146; B60W 30/08; B60W 30/0953; B60W 2420/408; B60W 30/18163; B60W 40/06; B60W 30/09; B60W 30/00; B60W 10/20; B60W 30/02; B60W 2520/06; B60W 50/0098; B60W 10/18; B60W 2554/4041; B60W 2554/806; B60W 30/10; B60W 2720/24; B60Q 9/008; B60Q 1/34; B60Q 9/005; B60Q 1/143; B60Q 1/2665; B60Q 1/30; B60Q 1/303; B60Q 1/535; B60K 35/22; B60K 2360/178; B60K 2360/21; B60K 35/215; B60K 2360/176; B60K 2360/173; B60K 2360/779; B60K 35/21; B60K 2360/184; G01S 13/867; G01S 13/93; G01S 19/42; G01S 13/931; G01S 5/0027; G06T 2207/30256; G06T 2207/30261; G06T 7/62; G06T 5/50; G06T 2207/10016; G06T 2207/20081; G06T 2207/30252; G06T 7/00

See application file for complete search history.

(56) References Cited

U.S. PATENT DOCUMENTS

| | | | | |
|---|---|---|---|---|
| 2016/0343253 | A1* | 11/2016 | Imai | G06V 20/582 |
| 2018/0288371 | A1* | 10/2018 | Nose | H04N 7/181 |
| 2022/0237926 | A1* | 7/2022 | Jumonji | G06V 20/582 |

FOREIGN PATENT DOCUMENTS

| | | |
|---|---|---|
| JP | 2015-121952 A | 7/2015 |
| JP | 2020-201714 A | 12/2020 |

* cited by examiner

WRONG-WAY DRIVING DETERMINATION METHOD AND WRONG-WAY DRIVING DETERMINATION DEVICE

CROSS-REFERENCE TO RELATED APPLICATION

This application claims priority to Japanese Patent Application No. 2022-005277 filed on Jan. 17, 2022, incorporated herein by reference in its entirety.

BACKGROUND

1. Technical Field

The present disclosure relates to a wrong-way driving determination method and a wrong-way driving determination device that determine "wrong-way driving" in which a vehicle travels in a direction opposite to a direction indicated by a road or a lane.

2. Description of Related Art

Japanese Unexamined Patent Application Publication No. 2007-293390 (JP 2007-293390 A) discloses a wrong-way driving warning device. The conventional device recognizes an installation position of a road sign included in an image forward of a vehicle, the image being acquired from a camera. The conventional device also determines wrong-way driving based on a relative position of the installation position with respect to a travel lane. Specifically, when it is determined that the installation position is located on the left side with respect to the travel lane, it is determined that the vehicle is traveling in a correct direction. On the other hand, when it is determined that the installation position is located on the right side with respect to the travel lane, it is determined that the vehicle is traveling in a wrong direction. When it is determined that the vehicle is traveling in the wrong direction, the conventional device warns a driver that the vehicle is traveling in the wrong direction.

SUMMARY

According to the above-described conventional device, it is possible to determine that the vehicle is traveling in the wrong direction based on recognition information of the installation position of the road sign using the image forward of the vehicle. However, it is desirable that the state in which the vehicle is traveling in the wrong direction be detected earlier or more reliably from the viewpoint of traffic safety, and therefore, further improvement is required.

One object of the present disclosure is to provide a technique capable of detecting wrong-way driving of the vehicle earlier or more reliably.

A wrong way driving determination method according to a first aspect of
the present disclosure includes:
acquiring an image rearward of a vehicle;
recognizing a target included in the image rearward of the vehicle; and
determining wrong-way driving of the vehicle based on recognition information of the target.
Determining the wrong-way driving includes
determining whether recognition information of a guide display surface of a traffic sign is included in the recognition information of the target.

When determination is made that the recognition information of the guide display surface is included in the recognition information of the target, determination is made that the vehicle is traveling in a wrong direction.

A wrong-way driving determination method according to a second aspect of the present disclosure includes:
acquiring an image forward of a vehicle and an image rearward of the vehicle;
recognizing a target around the vehicle using the image forward of the vehicle and the image rearward of the vehicle;
calculating wrong-way driving likelihood based on recognition information of the target; and
determining that the vehicle is traveling in a wrong direction when the wrong-way driving likelihood is equal to or larger than a threshold value.

A higher value is used for a calculation factor of the wrong-way driving likelihood when recognition information of a guide display surface of a traffic sign is included in the recognition information of the target using the image rearward of the vehicle than when the recognition information of the guide display surface of the traffic sign is not included, in calculation of the wrong-way driving likelihood.

In the wrong-way driving determination method according to the second aspect, the recognition information of the target may include recognition information of a lane on which the vehicle travels. Further, the recognition information of the guide display surface may include recognition information of a lane corresponding to the guide display surface.

Here, in the calculation of the wrong-way driving likelihood, when determination is made that the recognition information of the guide display surface is included in the recognition information of the target using the image rearward of the vehicle, determining whether a lane on which the vehicle travels and that is recognized in the image rearward of the vehicle matches a lane corresponding to the guide display surface recognized in the image rearward of the vehicle may further be included.

A higher value may be used for the calculation factor of the wrong-way driving likelihood when determination is made that the lane on which the vehicle travels and that is recognized in the image rearward of the vehicle matches the lane corresponding to the guide display surface recognized in the image rearward of the vehicle than when determination is made that the lane on which the vehicle travels and that is recognized in the image rearward of the vehicle does not match the lane corresponding to the guide display surface recognized in the image rearward of the vehicle.

In the wrong-way driving determination method according to the second aspect, the recognition information of the target may include recognition information of the total number of lanes of a road on which the vehicle travels.

Here, in the calculation of the wrong-way driving likelihood, when determination is made that the recognition information of the guide display surface is included in the recognition information of the target using the image rearward of the vehicle, determining whether the total number of lanes is one may further be included.

A higher value may be used for the calculation factor of the wrong-way driving likelihood when the total number of lanes is determined to be one than when the total number of lanes is not determined to be one.

In the wrong-way driving determination method according to the second aspect, the recognition information of the guide display surface may include information of a time at which at least one of the image forward of the vehicle including the recognition information of the guide display surface and the image rearward of the vehicle including the recognition information of the guide display surface is acquired.

Here, in the calculation of the wrong-way driving likelihood, when determination is made that the recognition information of the guide display surface is included in the recognition information of the target using the image rearward of the vehicle, determining whether recognition information of a guide display surface of a traffic sign different from the guide display surface is acquired may further be included in the recognition information of the target using the image forward of the vehicle until an elapsed time counted from a time at which the image rearward of the vehicle is acquired exceeds a predetermined time.

A higher value may be used for the calculation factor of the wrong-way driving likelihood when determination is made that the recognition information of the guide display surface of the traffic sign different from the guide display surface is acquired until the elapsed time exceeds the predetermined time than when determination is made that the recognition information of the guide display surface of the traffic sign different from the guide display surface is not acquired until the elapsed time exceeds the predetermined time.

A wrong-way driving determination device according to a third aspect of the present disclosure includes:
a memory storing an image rearward of a vehicle; and
a processor.
Here, the processor is configured to
recognize a target around the vehicle using the image rearward of the vehicle, and determine wrong-way driving of the vehicle based on recognition information of the target.
The processor is configured to,
in determination of the wrong-way driving, determine whether recognition information of a guide display surface of a traffic sign is included in the recognition information of the target, and
when determination is made that the recognition information of the guide display surface is included in the recognition information of the target, determine that the vehicle is traveling in a wrong direction, A wrong-way driving determination device according to a fourth aspect of
the present disclosure includes:
a memory storing an image forward of a vehicle and an image rearward of the vehicle; and
a processor.
Here, the processor is configured to
recognize a target around the vehicle using the image forward of the vehicle and the image rearward of the vehicle,
calculate wrong-way driving likelihood based on recognition information of the target, and
when the wrong-way driving likelihood is equal to or larger than a threshold value, determine that the vehicle is traveling in a wrong direction.

The processor is configured to use a higher value for a calculation factor of the wrong-way driving likelihood when recognition information of a guide display surface of a traffic sign is included in the recognition information of the target than when the recognition information of the guide display surface of the traffic sign is not included, in calculation of the wrong-way driving likelihood.

In the wrong-way driving determination device according to the fourth aspect, the recognition information of the target may include recognition information of a lane on which the vehicle travels.

The recognition information of the guide display surface may include recognition information of a lane corresponding to the guide display surface.

Here, the processor may be configured to
further determine whether a lane on which the vehicle travels and that is recognized in the image rearward of the vehicle matches a lane corresponding to the guide display surface recognized in the image rearward of the vehicle when determination is made that the recognition information of the guide display surface is included in the recognition information of the target using the image rearward of the vehicle, in the calculation of the wrong-way driving likelihood.

use a higher value for the calculation factor of the wrong-way driving likelihood when determination is made that the lane on which the vehicle travels and that is recognized in the image rearward of the vehicle matches the lane corresponding to the guide display surface recognized in the image rearward of the vehicle than when determination is made that the lane on which the vehicle travels and that is recognized in the image rearward of the vehicle does not match the lane corresponding to the guide display surface recognized in the image rearward of the vehicle.

In the wrong-way driving determination device according to the fourth aspect, the recognition information of the target may include recognition information of the total number of lanes of a road on which the vehicle travels.

Here, the processor may be configured to,
in the calculation of the wrong-way driving likelihood,
further determine whether the total number of lanes is one when determination is made that the recognition information of the guide display surface is included in the recognition information of the target using the image rearward of the vehicle, and
use a higher value for the calculation factor of the wrong-way driving likelihood when the total number of lanes is determined to be one than when the total number of lanes is not determined to be one.

In the wrong-way driving determination device according to the fourth aspect, the recognition information of the guide display surface may include information of a time at which at least one of the image forward of the vehicle including the recognition information of the guide display surface and the image rearward of the vehicle including the recognition information of the guide display surface is acquired.

Here, the processor may be configured to
further determine whether recognition information of a guide display surface of a traffic sign different from the guide display surface is acquired with respect to the recognition information of the target using the image forward of the vehicle until an elapsed time counted from a time at which the image rearward of the vehicle is acquired exceeds a predetermined time when determination is made that the recognition information of the guide display surface is included in the recognition information of the target using the image rearward of the vehicle, in the calculation of the wrong-way driving likelihood, use a higher value for the calculation factor of the wrong-way driving likelihood when determination is made that the recognition information of the guide display surface of the traffic sign different from the guide display surface is acquired until the elapsed time exceeds the predetermined time than when determination is made that the recognition information of the guide display surface of the traffic sign different from the guide display surface is not acquired until the elapsed time exceeds the predetermined time.

According to the first or fifth aspect, when the recognition information of the guide display surface of the traffic sign is included in the recognition information of the target using the image rearward of the vehicle, determination can be made that the vehicle is traveling in a wrong direction. Therefore, it is possible to detect that the vehicle is traveling in the wrong direction at an early stage.

According to the second or seventh aspect, when the recognition information of the guide display surface of the traffic sign is included in the recognition information of the target using the image rearward of the vehicle, a high value is used for the calculation factor of the wrong-way driving likelihood, so that it is easy to determine that the wrong-way driving likelihood is equal to or larger than the threshold value. Therefore, it is possible to detect that the vehicle is traveling in the wrong direction at an earlier stage.

According to the third, fourth, fifth, eighth, ninth, or tenth aspect, it is possible to avoid a problem in which it is erroneously determined that the vehicle is traveling in the wrong direction even though the vehicle is traveling in the correct direction. That is, it is possible to reliably detect that the vehicle is traveling in the wrong direction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a wrong-way driving determination method and a wrong-way driving determination device according to an embodiment of the present disclosure will be described with reference to the drawings. Note that the wrong-way driving determination method according to the embodiment is realized by computer processing performed in the wrong-way driving determination device. In each figure, the same or corresponding parts are designated by the same reference signs to simplify or omit the description.

Figure 1:
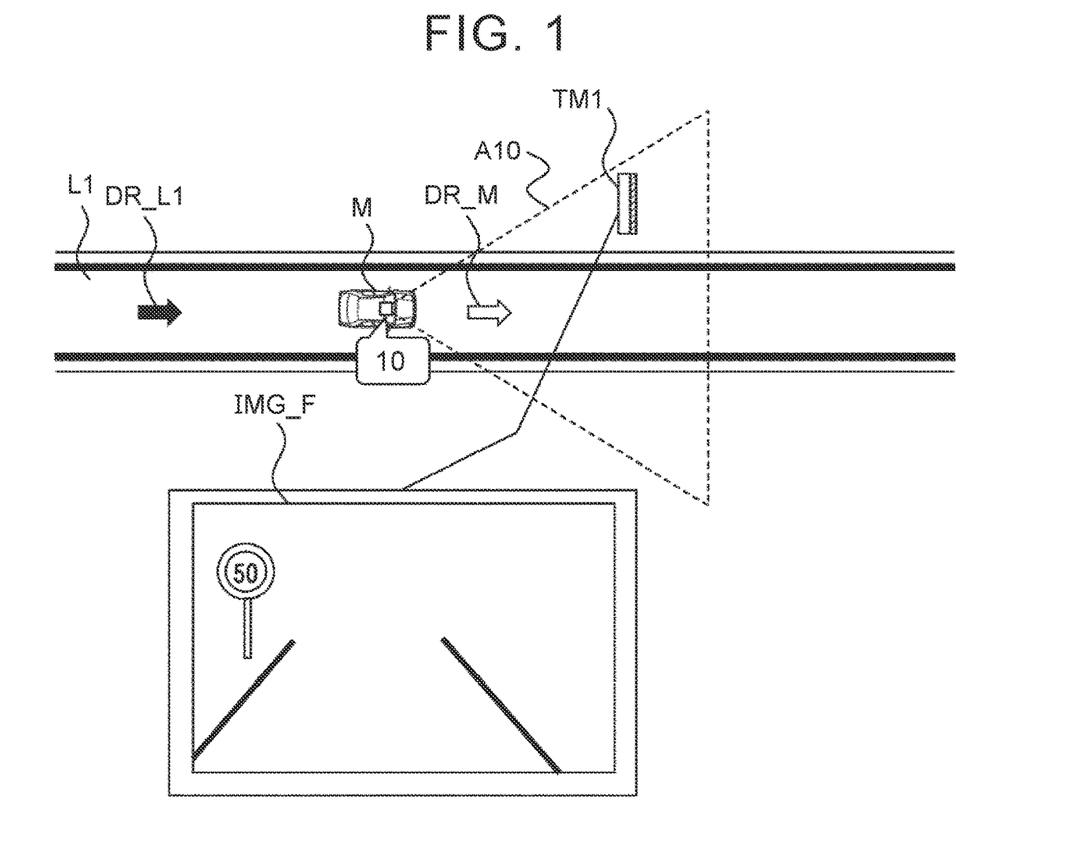
FIG. 1 is a diagram for explaining an outline of an embodiment of the present disclosure.

1. Summary of the Embodiment
1-1. Example of the Situation During the Forward Running of the Vehicle FIG. 1 is a diagram for explaining an outline of an embodiment of the present disclosure. FIG. 1 illustrates a vehicle M traveling on a lane L1. The direction DR_M in which the vehicle M travels is the same direction as the direction DR_L1 indicated by the lane L1. That is, the vehicle M shown in FIG. 1 is "running forward" on the lane L1.

The front camera 10 is mounted on the vehicle M. In FIG. 1, an angle of view A10 of the front camera 10 is schematically illustrated, and a traffic sign TM1 on the left front side of the vehicle M is located in the area of the angle of view A10. The front image IMG_F depicted in FIG. 1 is an example of an image acquired by the front camera 10. The front image IMG_F includes a guide display surface (a surface on which the speed limit is displayed) of the traffic sign TM1 and a lane (that is, a lane L1) on which the vehicle M travels.

1-2. Example of the Situation in the Vehicle Travels in a Wrong Direction

Figure 2:
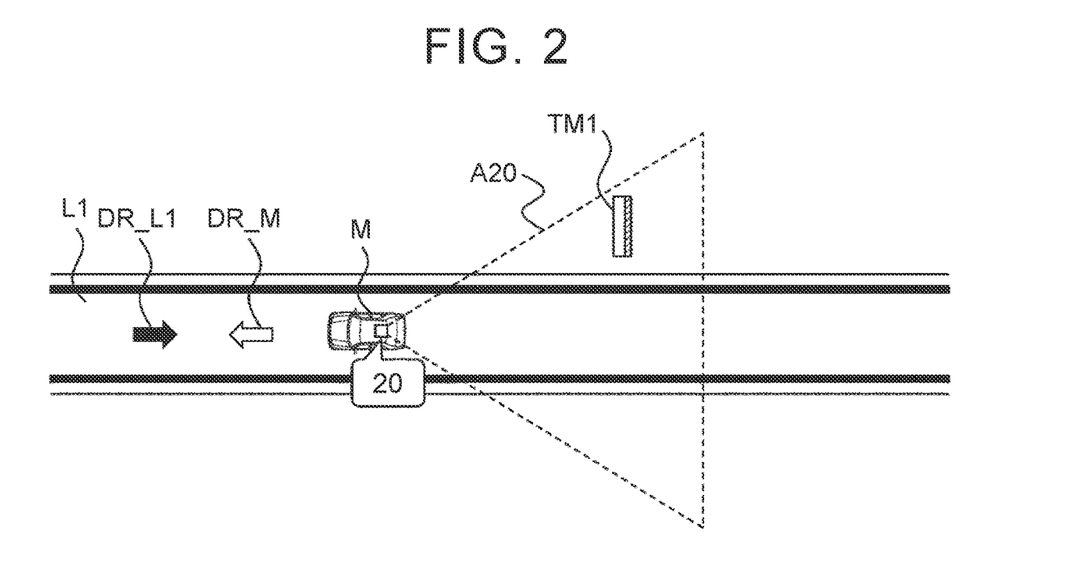
FIG. 2 is a diagram for explaining an outline of an embodiment.

FIG. 2 is a diagram for explaining an outline of the embodiment. As in FIG. 1, FIG. 2 illustrates a vehicle M traveling on a lane L1. However, unlike FIG. 1, the direction DR_M in which the vehicle M travels is opposite to the direction DR_L1 indicated by the lane L1. That is, the vehicle M shown in FIG. 2 is "wrong-way driving" on the lane L1.

In addition to the front camera 10 shown in FIG. 1, a rear camera 20 is mounted on the vehicle M. In FIG. 2, an angle of view A20 of the rear camera 20 is schematically depicted, and a traffic sign TM1 is positioned in the area of the angle of view A20. The rear image IMG_R depicted in FIG. 2 is an example of an image acquired by the rear camera 20. The rear image IMG_R includes a guide displaying surface of the traffic sign TM1 and a lane (that is, the lane L1) on which the vehicle M travels.

1-3. Wrong-Way Driving Determination

In the embodiment, based on the recognition information of the target included in the front image IMG_F and the rear image IMG_R, a "wrong-way driving determination" is performed to determine whether or not the vehicle M is traveling in the wrong direction. In the wrong-way driving determination, it is determined whether or not the wrong-way driving likelihood H is equal to or greater than the thresholds TH. When it is determined that the wrong-way driving likelihood H is equal to or larger than the thresholds TH, it is determined that the vehicle M is traveling in the wrong direction.

The wrong-way driving likelihood H is calculated by, for example, Equation (1) below which represents the sum of the road type factor ηr and the wrong-way driving factor ηk ($1 \leq k \leq n$).

$$H = \eta r + \Sigma \eta k \tag{1}$$

The road type factor ηr is a factor (calculation factor) used for calculating the wrong-way driving likelihood H, and is set corresponding to the type of the road on which the vehicle M travels (specifically, the ordinary road and the expressway). The type of the road is estimated on the basis of, for example, information of a demarcation line drawn on the road included in the front image IMG_F, recognition information of a structure existing around the road, and the like. For example, a division line drawn on a general road includes a yellow one, and a division line drawn on an expressway does not include a yellow one. Therefore, the type of the road can be estimated from the color information of the division line. In addition, structures peculiar to the expressway such as a central separation zone and a soundproof wall exist around the expressway. Therefore, the type of the road can be estimated from the information of the structure. The type of the road may be estimated based on color information of the road included in the rear image IMG_R, recognition information of a structure existing around the road, and the like.

In the embodiment, the road type factor $\eta r$ when the type of the road on which the vehicle M travels is estimated to be an expressway and the road type factor $\eta r$ when the type of the road is estimated to be a general road are set, and the former is set to a value higher than the latter. The reason for this is to detect the wrong-way driving while traveling on the expressway at an earlier stage.

The wrong-way driving factor $\eta k$ is a factor (calculation factor) used for calculating the wrong-way driving likelihood H, and is set based on an event recognized during running of the vehicle (total number of events=n). An example of an event that is recognized while the vehicle is running is that the direction of a traffic sign (road paint) drawn on a lane is recognized. Here, the traffic sign on the lane is drawn in a direction in which the driver of the vehicle easily recognizes the traffic sign. That is, there is a certain standard in the drawing direction of the traffic sign on the lane. Therefore, it can be said that the recognition direction of the traffic sign is the same as the traveling direction of the vehicle is an event recognized while the vehicle travels in the correct direction, and that the recognition direction of the traffic sign is the opposite to the traveling direction of the vehicle is an event recognized while the vehicle travels in the wrong direction.

In the embodiment, the wrong-way driving factor $\eta k$ is set when the traffic sign on the lane L1 is recognized from the front image IMG_F and it is recognized that the drawing direction of the traffic sign is reversed with respect to the prescribed direction. In addition, when the traffic sign on the lane L1 is recognized from the rear image IMG_R and it is recognized that the drawing direction of the traffic sign is the same as the prescribed direction, the corresponding wrong-way driving factor ilk is set. For example, the same value is set for the former and the latter.

Another example of an event that is recognized during the travel of a vehicle is that a guide display surface of a traffic sign installed around a lane is recognized. The "guide display surface" is a generic term for a surface on which a guide, a warning, an instruction, a prohibition on road traffic, a restriction, and the like are displayed for a road user. For example, in the front image IMG_F, it can be said that the fact that the guide display surface of the traffic sign (for example, the traffic sign TM1 shown in FIG. 1) located on the left side of the lane L1 is recognized is an event recognized during the forward running of the vehicle. On the other hand, in the front image IMG_F, the fact that the rear surface of the traffic sign located on the right side of the lane L1 (that is, the surface located on the opposite side of the guide display surface) is recognized can be said to be an event recognized while the vehicle travels in the wrong direction.

In the embodiment, in the front image IMG_F, the wrong-way driving factor $\eta k$ corresponding to the case where the rear surface of the traffic sign located on the right side of the lane L1 is recognized is set. For example, in the front image IMG_F, the wrong-way driving factor $\eta k$ is set to a higher value as the number of recognizes on the back surface of the traffic sign located on the right side of the lane L1 increases.

Regarding the guide display surface of the traffic sign installed around the lane L1, it can be said that the recognition of the guide display surface of the vehicle entry prohibition included in the front image IMG_F is an event recognized while the vehicle travels in the wrong direction. In the embodiment, in the front image IMG_F, the wrong-way driving factor $\eta k$ corresponding to the case where the vehicle entry prohibition guide display surface located on the left side of the lane L1 is recognized is set.

1-4. Characteristics of the Wrong-Way Driving Determination

However, since the traffic sign on the lane L1 is drawn so that the driver of the vehicle M can easily recognize the traffic sign visually, it is assumed that the traffic sign is not recognized in the front image IMG_F. Further, since the rear surface of the traffic sign has few features for specifying this, it is expected that it is difficult to recognize the rear surface of the traffic sign located on the right side of the lane L1 in the front image IMG_F. In this regard, it can be said that the recognition information of the guide display surface of the vehicle entry prohibition is easily recognized in the front image IMG_F. However, depending on the installation position of the vehicle entry prohibition sign and the direction of the guide display surface, a case is assumed in which the vehicle entry prohibition guide display surface is not recognized in the front image IMG_F.

Therefore, in the embodiment, the wrong-way driving factor $\eta k$ corresponding to the case where the guide display surface of the traffic sign located on the left side of the lane L1 is recognized in the rear image IMG_R is set as the new wrong-way driving factor $\eta k$. For example, in the rear image IMG_R, the wrong-way driving factor $\eta k$ is set to a higher value as the number of recognition of the guide display surface of the traffic sign located on the left side of the lane L1 increases.

Unlike the traffic sign on the lane L1 or the rear surface of the traffic sign installed around the lane L1, the guide display surface of the traffic sign included in the rear image IMG_R can be said to be easily recognized in the rear image IMG_R. In addition, the number of guide display surfaces of the traffic sign located on the left side of the lane L1 in the rear image IMG_R is theoretically the same as the number of guide display surfaces of the traffic sign located on the right side of the lane L1 in the front image IMG_F. Therefore, it can be said that the guide display surface of the traffic sign located on the left side of the lane L1 in the rear image IMG_R has more opportunities to be recognized than the vehicle entry prohibition sign located on the left side of the lane L1 in the front image IMG_F.

Therefore, the wrong-way driving likelihood H is easily determined to be equal to or larger than the thresholds TH by setting the wrong-way driving factor ilk corresponding to the case where the guide displaying surface of the traffic sign is recognized in the rear image IMG_R. As described above, according to the embodiment, by increasing the chance that the wrong-way driving factor $\eta k$ is calculated, it is possible to detect that the vehicle M is traveling in the wrong direction at an earlier stage. This leads to an improvement in traffic safety around the vehicle M.

Hereinafter, the wrong-way driving determination method and the wrong-way driving determination device according to the embodiment will be described in detail.

2. Wrong-Way Driving Determination Device
2-1. Configuration Example

Figure 3:
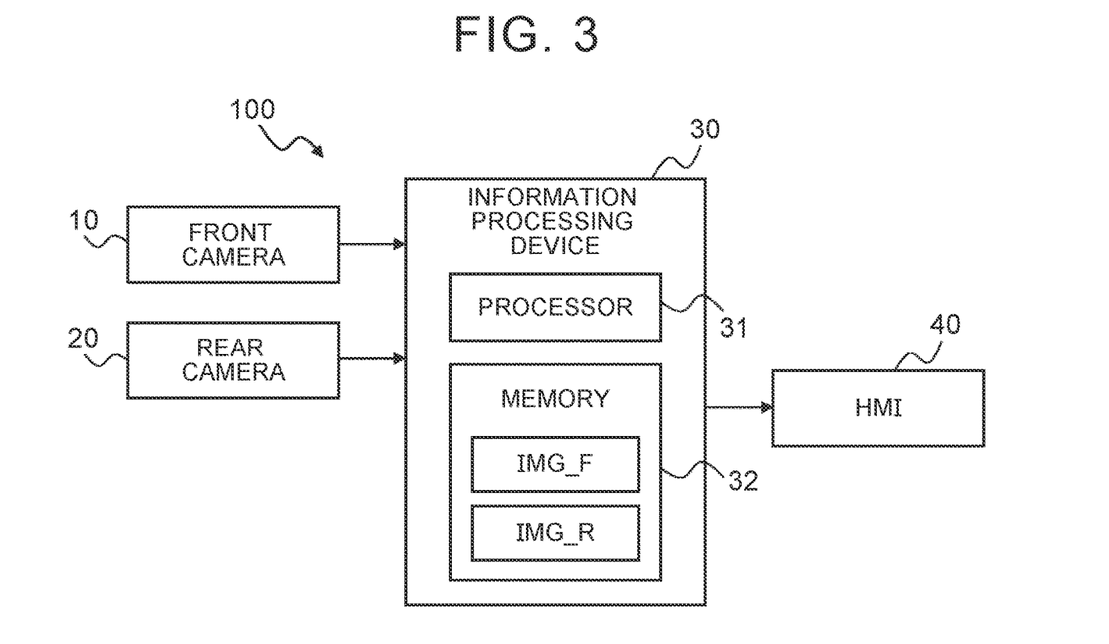
FIG. 3 is a block diagram illustrating a configuration example of the wrong way driving determination device according to the embodiment.

FIG. 3 is a block diagram illustrating a configuration example of a wrong-way driving determination device according to the embodiment. In the embodiment illustrated in FIG. 3, the wrong-way driving determination device 100 includes a front camera 10, a rear camera 20, an information processing device 30, and a Human Machine Interface (HMI) unit 40. Note that the wrong-way driving determination device 100 is mounted on the vehicle M shown in FIG. 1 or 2.

The front camera 10 is a digital camera that captures an image of the front of the vehicle M. The front camera 10 includes, for example, an imaging device such as a Charge Coupled Device (CCD) or a CMOS Image Sensor (CIS). The front camera 10 includes a wide-angle lens or a fisheye lens, and captures an angle of view A10 (for example, in a range of 140° to 220°) in the horizontal direction. The front camera 10 transmits the front image IMG_F to the information processing device 30.

The rear camera 20 is a digital camera that captures an image of the rear of the vehicle M. The basic configuration example of the rear camera 20 is the same as that of the front camera 10. The rear camera 20 photographs an angle of view A20 (for example, in a range of 140° to 220°) in the horizontal direction. The rear camera 20 transmits the rear image IMG_R to the information processing device 30.

The information processing device 30 includes at least one processor 31 and at least one memory 32. The processor 31 executes various processes. Examples of the memory 32 include a volatile memory and a non-volatile memory. The memory 32 stores various data. The various types of data include a front image IMG_F from the front camera 10 and a rear image IMG_R from the rear camera 20. When the processor 31 executes various computer programs, various functions of the processor 31 are realized. Various functions will be described later. The computer program is stored in the memory 32 or recorded in a computer-readable recording medium.

The HMI unit 40 provides information to the driver of the vehicle M and receives information from the driver. The HMI unit 40 includes, for example, an input device, a display device, a speaker, and a microphone. Examples of the input device include a touch panel, a keyboard, a switch, and a button. The information provided to the driver includes a traveling state of the vehicle M and a predetermined alert. The information is provided to the driver using, for example, a display device and a speaker.

2-2. Functional Configuration Example of Information Processing Device

Figure 4:
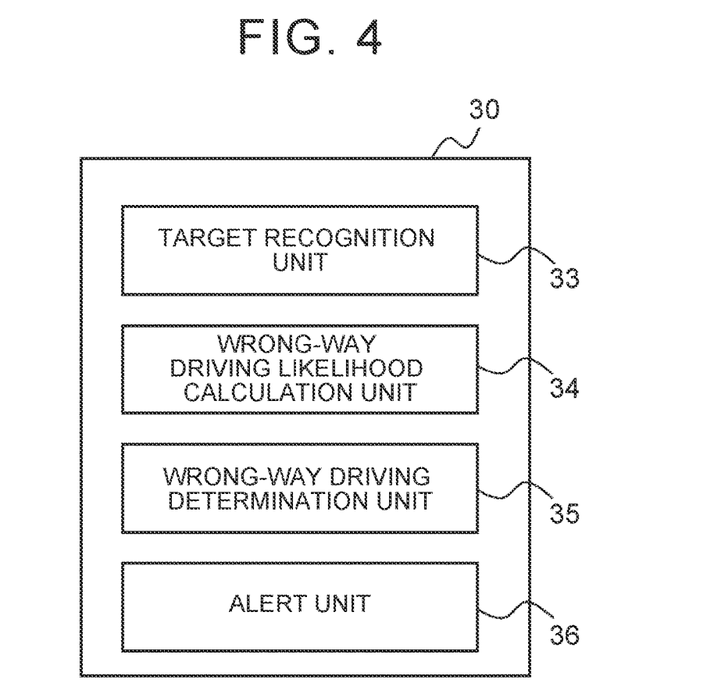
FIG. 4 is a block diagram illustrating an example of a functional configuration of the information processing device illustrated in FIG. 3.

FIG. 4 is a block diagram illustrating an example of a functional configuration of the information processing device 30 illustrated in FIG. 3. In the example illustrated in FIG. 4, the information processing device 30 includes a target recognition unit 33, a wrong-way driving likelihood calculation unit 34, a wrong-way driving determination unit 35, and an alert unit 36. These functional blocks are realized by the processor 31 executing software for determining wrong-way driving, which is a computer program.

The target recognition unit 33 performs a process of recognizing a target around the vehicle M (target recognition process). The target recognition process is performed based on each of the front image IMG_F and the rear image IMG_R. As a method of target recognition based on the front image IMG_F and the rear image IMG_R, a known method such as machine learning is applied. According to the target recognition processing, the static and dynamic targets existing around the vehicle NI are recognized. Examples of the static target include a lane division line, a guardrail, and a structure of a lane on which the vehicle M travels. Examples of dynamic targets include pedestrians, bicycles, motorcycles, and automobiles.

The information of the target object recognized by the target object recognition process (that is, the recognition information of the target object) is transmitted to the wrong-way driving likelihood calculation unit 34. Here, the recognition information of the target includes recognition information of the road on which the vehicle M travels. The recognition information of the road may include information on the type of the road on which the vehicle M travels (general road, expressway). The recognition information of the target may also include recognition information of a traffic sign on a lane on which the vehicle M travels. The recognition information of the traffic sign on the lane may include information on a drawing direction of the traffic sign.

The recognition information of the target object may further include the recognition information of the guide display surface and the rear surface of the traffic sign installed around the lane on which the vehicle M travels. The recognition information of the guide display surface may also include recognition information of the guide display surface in which the vehicle entry is prohibited. Further, the recognition information of the guide display surface may include information on a lane corresponding to the guide display surface. The "lane corresponding to the guide display surface" means a lane to which information indicated on the guide display surface is transmitted. The "lane corresponding to the guide display surface" is estimated based on, for example, a domestic standard relating to a method of installing a traffic sign.

In our country, many traffic signs are installed in the roadside system in accordance with the standard specified by the Ministry of Land, Infrastructure and Transport. There are traffic signs installed in cantilever type (overhang type), gate type (overhead type), and supplementary type (system using crosswalks, utility poles, etc.). Therefore, when the guide display surface is recognized in the front image IMG_F, it is estimated that the lane recognized to the right or lower side of the recognition area of the guide display surface is a "lane corresponding to the guide display surface". Further, when the guide display surface is recognized in the rear image IMG_R, it is estimated that the lane recognized to the left or lower side of the recognition area of the guide display surface is a "lane corresponding to the guide display surface".

The wrong-way driving likelihood calculation unit 34 calculates the wrong-way driving likelihood H based on the target recognition data received from the target recognition unit 33. The calculation of the wrong-way driving likelihood H is performed, for example, on the basis of a calculation equation (see the above equation (1)) in which the road type factor $\eta r$ and the wrong-way driving factor $\eta k$ ($1 \leq k \leq n$) are set as variables.

As described above, the road type factor $\eta r$ is set corresponding to the type of the road on which the vehicle M travels (specifically, the general road and the expressway). The wrong-way driving factor $\eta k$ is set based on an event recognized during traveling of the vehicle. The road type factor $\eta r$ and the wrong-way driving factor $\eta k$ are stored in a predetermined database as, for example, map data. The wrong-way driving likelihood calculation unit 34 identifies the road type factor $\eta r$ and the wrong-way driving factor $\eta k$ corresponding to the recognition information by referring to the map data using the recognition information of the target received from the target recognition unit 33. Then, the wrong-way driving likelihood calculation unit 34 calculates the wrong-way driving likelihood H on the basis of the road type factor ηr and the wrong-way driving factor ηk obtained by referring to the map data and a calculation equation using these as variables.

The wrong-way driving likelihood calculation unit 34 may additionally perform the following determination when specifying the road type factor ηr and the wrong-way driving factor ηk corresponding to the recognition information of the target.

Figure 5:
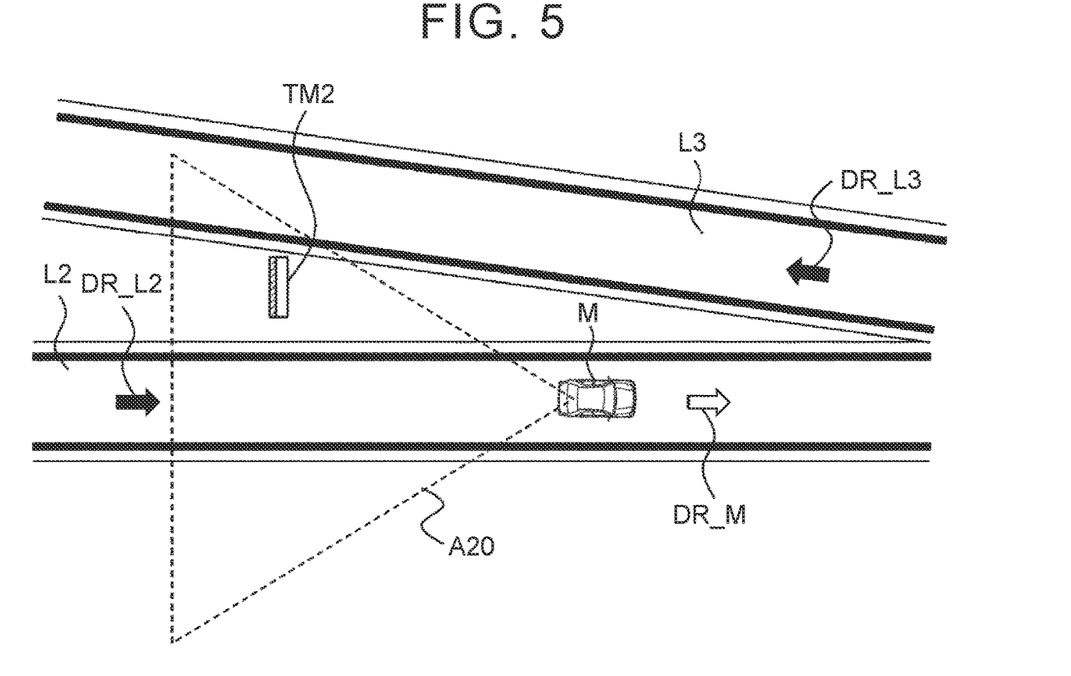
FIG. 5 is a diagram for explaining a case where a determination based on recognition information of a lane corresponding to a guide display surface is performed.

The first additional determination includes a determination based on the recognition information of the lane corresponding to the guide display surface. FIG. 5 is a diagram illustrating a case where a determination is performed based on recognition information of a lane corresponding to a guide display surface. In the example shown in FIG. 5, the vehicle M is traveling on the lane L2. The direction DR_M in which the vehicle M travels is the same direction as the direction DR_L2 indicated by the lane L2. That is, the vehicle M shown in FIG. 5 is "running forward" on the lane L2. In the example shown in FIG. 5, a lane L3 exists near the lane L2. The lane L3 is, for example, a lane that forms a Y-shaped intersection with the lane L2. The direction DR_L3 indicated by the lane L3 is a direction opposite to the direction DR_L2.

In the embodiment shown in FIG. 5, the traffic sign TM2 exists in the area of the angle of view A20. Therefore, the recognition information of the target received from the target recognition unit 33 includes the recognition information of the guide displaying surface of the traffic sign TM2 in the rear image IMG_R. However, the transmission destination of the information indicated on the guide displaying surface of the traffic sign TM2 is not the lane L2 but the lane L3. Therefore, when only the recognition information of the guide display surface of the traffic sign TM2 in the rear image IMG_R is received, there is a possibility that the wrong-way driving factor ηk is identified by referring to the map data based on the recognition information.

In the first additional determination, when the recognition information of the target received from the target recognition unit 33 includes information on the lane (that is, the lane L3) corresponding to the guide displaying surface of the traffic sign TM2 in the rear image IMG_R, this information is used. Then, it is determined whether or not the lane corresponding to the guide displaying surface of the traffic sign TM2 matches the lane (that is, the lane L2) on which the vehicle M travels. In the example shown in FIG. 5, since it is determined that the two are not identical, the wrong-way driving factor ilk is not specified. Further, it is assumed that the recognition information of the lane on which the vehicle M travels is included in the recognition information of the target received from the target recognition unit 33.

Figure 6:
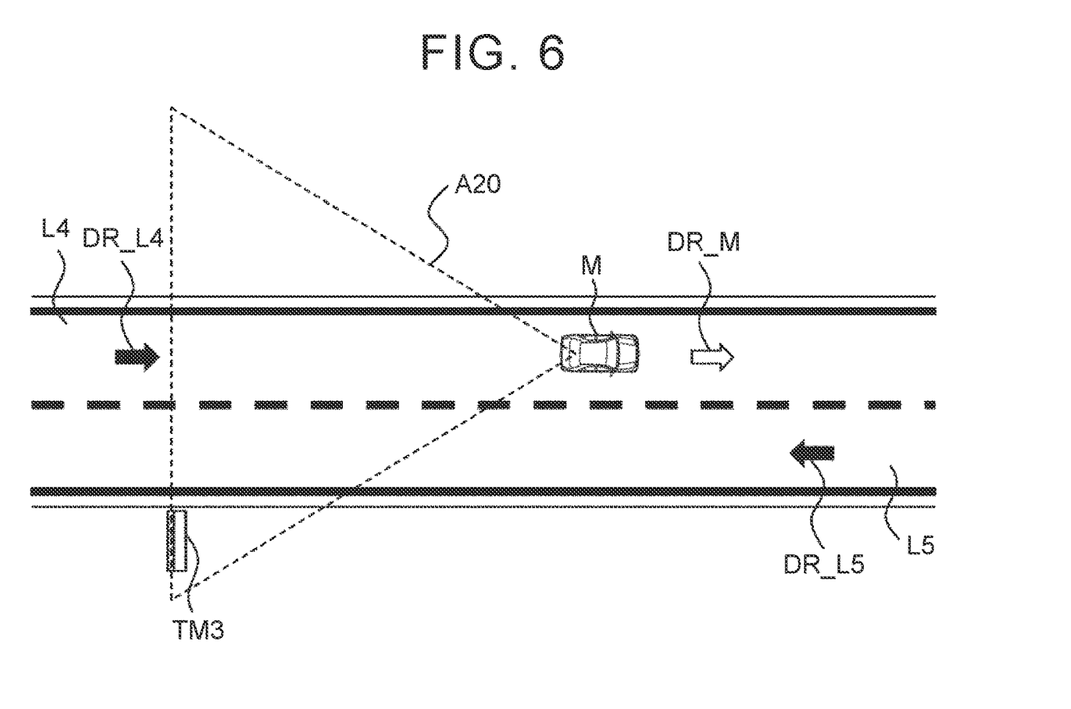
FIG. 6 is a diagram for explaining a case where a determination based on the total number of lanes of a road on which a vehicle travels is performed.

The second additional determination includes a determination based on the total number of lanes of the road on which the vehicle M travels. FIG. 6 is a diagram illustrating a case where a determination is performed based on the total number of lanes of a road on which the vehicle M travels. In the example shown in FIG. 6, the vehicle M is traveling on the lane L4. The direction DR_M in which the vehicle M travels is the same direction as the direction DR_L4 indicated by the lane L4. That is, the vehicle M shown in FIG. 6 is "running forward" on the lane L4. In the example shown in FIG. 6, there is also a lane L5 adjacent to the lane L4. The lane L5 is, for example, an opposite lane of the lane L4. The direction DR_L5 indicated by the lane L5 is a direction opposite to the direction DR_L4.

In the embodiment shown in FIG. 6, the traffic sign TM3 exists in the area of the angle of view A20. Therefore, the recognition information of the target received from the target recognition unit 33 includes the recognition information of the guide displaying surface of the traffic sign TM3 in the rear image IMG_R. However, the transmission destination of the information indicated on the guide displaying surface of the traffic sign TM3 is not the lane L4 but the lane L5. Therefore, when only the recognition information of the guide display surface of the traffic sign TM3 in the rear image IMG_R is received, there is a possibility that the wrong-way driving factor ηk is identified by referring to the map data based on the recognition information.

In the second additional determination, when the recognition information of the target received from the target recognition unit 33 includes information on the total number of lanes (that is, two lanes) of the road on which the vehicle M travels, this information is used. Then, it is determined whether or not the total number of lanes of the road on which the vehicle M travels is one, in the example illustrated in FIG. 6, since it is determined that the total number of lanes is not one, the wrong-way driving factor ηk is not specified. Further, it is assumed that the information on the total number of lanes of the road on which the vehicle M travels is included in the recognition information of the target received from the target recognition unit 33.

Figure 7:
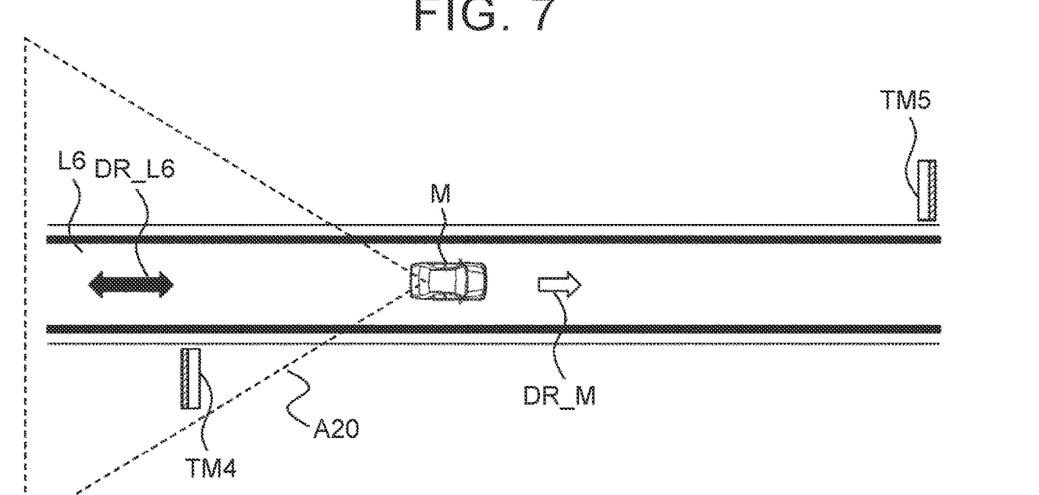
FIG. 7 is a diagram illustrating a case where a determination based on a time at which a rear image in which a guide display surface of a traffic sign is recognized is acquired is performed.

The third additional determination includes a determination based on a time at which the rear image IMG_R in which the guide display surface of the traffic sign is recognized is acquired. FIG. 7 is a diagram illustrating a case where a determination is performed based on a time at which the rear image IMG_R in which the guide display surface of the traffic sign is recognized is acquired. In the example shown in FIG. 7, the vehicle M is traveling on the lane L6. The lane L6 is a lane allowing bidirectional passage. Therefore, the vehicle M shown in FIG. 7 "runs forward" on the lane L6.

In the embodiment illustrated in FIG. 7, the traffic sign TM4 exists in the area of the angle of view A20. Therefore, the recognition information of the target received from the target recognition unit 33 includes the recognition information of the guide displaying surface of the traffic sign TM4 in the rear image IMG_R. However, the destination of the information indicated on the guide displaying surface of the traffic sign TM4 is a vehicle traveling in the lane L6 in a direction opposite to the direction DR_M in which the vehicle M travels. Therefore, when only the recognition information of the guide display surface of the traffic sign TM4 in the rear image IMG_R is received, there is a possibility that the wrong-way driving factor ηk is identified by referring to the map data based on the recognition information.

In the third additional determination, when the recognition information of the target received from the target recognition unit 33 includes information on the time at which the rear image IMG_R in which the guide display surface of the traffic sign is recognized is acquired, this information is used. Then, until the elapsed time counted from this time exceeds a predetermined time, it is determined whether or not information regarding the time at which the forward image IMG_F in which the guide display surface of the traffic sign different from the guide display surface is recognized is received from the target recognition unit 33. In the embodiment illustrated in FIG. 7, since the information on the guide display surface of the traffic sign TM5 located at the traveling destination of the vehicle M is acquired, the result of this determination is negative, and the wrong-way driving factor ηk is not specified. Further, it is assumed that the information regarding the time at which the rear image IMG_R in which the guide display surface of the traffic sign is recognized is acquired and the time at which the rear image IMG_R in which another guide display surface is recognized is acquired is included in the recognition information of the target received from the target recognition unit 33.

The wrong-way driving determination unit 35 determines whether or not the vehicle M is traveling in the wrong direction. The wrong-way (hiving determination unit 35 determines whether or not the wrong-way driving likelihood H received from the wrong-way driving likelihood calculation unit 34 is equal to or greater than the thresholds TH. When it is determined that the wrong-way driving likelihood H is equal to or larger than the thresholds TH, it is determined that the vehicle M is traveling in the wrong direction. When it is determined that the vehicle M is traveling in the wrong direction, the wrong-way driving determination unit 35 transmits a signal indicating the wrong-way driving determination to the alert unit 36.

When the signal indicating the wrong-way driving determination is received from the wrong-way driving determination unit 35, the alert unit 36 gives a predetermined attention to the driver of the vehicle M. The predetermined alert is made, for example, by causing the HMI unit 40 (display device) to display an alert that the vehicle is traveling in the wrong direction. As another example, the audio "the vehicle is traveling in the wrong direction" is played back from the HMI unit 40 (speaker).

2-3. Example of Information Processing by Information Processing Device

Figure 8:
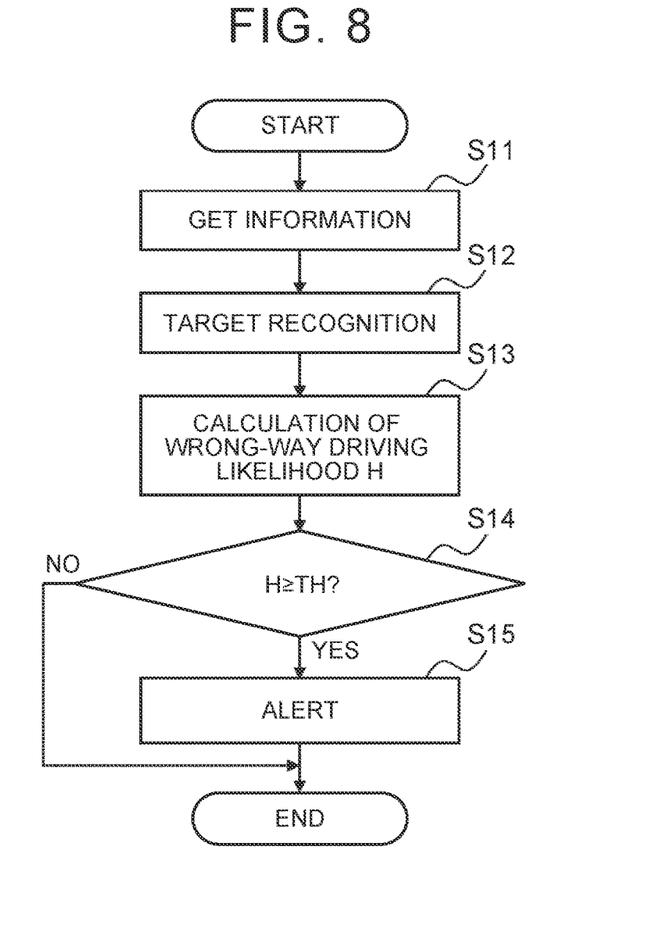
FIG. 8 is a flowchart illustrating a flow of processing performed by the information processing device illustrated in FIG. 3.

FIG. 8 is a flowchart illustrating a flow of processing performed by the information processing device 30 (processor 31) illustrated in FIG. 3. The flowchart illustrated in FIG. 8 is repeatedly executed at a predetermined control cycle.

In the routine illustrated in FIG. 8, first, various kinds of information are acquired (step S11). Examples of the various types of information include a front image IMG_F and a rear image IMG_R. The various types of information may include information on the time at which the front image IMG_F and the rear image IMG_R are acquired.

Following the processing of step S11, target recognition is performed (step S12). The target recognition is performed based on the front image IMG_F and the rear image IMG_R, respectively. As a method of target recognition based on the front image IMG_F and the rear image IMG_R, a known method such as machine learning is applied. According to the target recognition processing, the static and dynamic targets existing around the vehicle M are recognized.

After the process of step S12, the wrong-way driving likelihood H is calculated (step S13). The process of step S13 is performed based on the recognition information of the target obtained by the process of step S12. As described above, the recognition information of the target includes information for specifying the road type factor ηr and the wrong-way driving factor ηk. Therefore, in the process of step S13, the road type factor ηr and the wrong-way driving factor ηk corresponding to the recognition information are specified by referring to the map data using the recognition information of the target. Then, the wrong-way driving likelihood H is calculated based on the identified road type factor ηr and wrong-way driving factor ηk and a calculation equation (equation (1)) using these as variables.

In the process of step S13, in a case where additional information is included in the recognition information of the target obtained by the process of step S12, the first to third additional determination using the additional information may be performed. By performing the first to third additional determinations, it is possible to avoid a problem in which the wrong-way driving factor ηk is identified.

Following the process of step S13, it is determined whether or not the wrong-way driving likelihood H is equal to or greater than the thresholds TH (step S14). If the determination result of step S14 is affirmative, a predetermined alert is issued (step S15). An example of the alert is as described above.

3. Effects

According to the embodiment described above, the wrong-way driving factor ηk is calculated based on the recognition information of the target using the backward image IMG_R in addition to the recognition information of the target using the forward image IMG_F. In other words, the opportunity to calculate the wrong-way driving factor ηk is increased. Therefore, it is possible to detect that the vehicle M is traveling in the wrong direction at an earlier stage. This leads to an improvement in traffic safety around the vehicle M.

Further, according to the embodiment, when the first to third additional determinations are performed, it is possible to avoid a problem in which the wrong-way driving factor ηk is specified. Therefore, it is possible to reliably detect that the vehicle M is traveling in the wrong direction.

4. Modification of the Wrong-Way Driving Determination

In the above-described embodiment, the wrong-way driving likelihood H is calculated based on the recognition information of the target included in the front image IMG_F and the rear image IMG_R. However, the wrong-way driving likelihood H may be calculated based only on the recognition information of the target included in the backward image IMG_R. Furthermore, in this case, it is not necessary to calculate the wrong-way driving likelihood H. For example, it is determined whether or not the recognition information of the guide display surface of the traffic sign is included in the recognition information of the target included in the rear image IMG_R. When it is determined that the recognition information of the guide display surface is included in the recognition information of the target included in the rear image IMG_R, it may be determined that the vehicle M is traveling in the wrong direction. The present disclosure can be applied to autonomous driving of an autonomous driving vehicle.

What is claimed is:

1. A wrong-way driving determination device for a vehicle comprising:
   a memory;
   a front digital camera including Charge Coupled Device or a CMOS Image Sensor and a wide-angle lens or a fisheye lens, the front digital camera configured to capture a front image, which is of the front of the vehicle of an angle of view in a range of 140° to 220° in a horizontal direction, and store the captured front image in the memory;
   a rear digital camera including Charge Coupled Device or a CMOS Image Sensor and a wide-angle lens or a fisheye lens, the rear digital camera configured to capture a rear image, which is of the rear of the vehicle of an angle of view in a range of 140° to 220° in the horizontal direction, and store the captured front image in the memory; and a processor, wherein the processors is configured to:
  access the stored rear image;
  recognize a target around the vehicle using the accessed rear image; and
  determine wrong-way driving of the vehicle based on recognition information of the recognized target, by:
    determining a road type factor and a wrong-way driving factor based on the recognition information, the wrong-way driving factor being set based on whether a guide display surface of a traffic sign is included in the recognition information;
    calculating a likelihood of wrong-way driving based on the determined road type factor and determined wrong-way driving factor; and
    if the calculated likelihood of wrong-way driving is greater than a predetermined threshold, determine that the vehicle is traveling in a wrong direction.

* * * * *